June 26, 1934.   R. T. ST. JAMES   1,964,185
BRAKE OPERATING MECHANISM
Filed Oct. 30, 1930
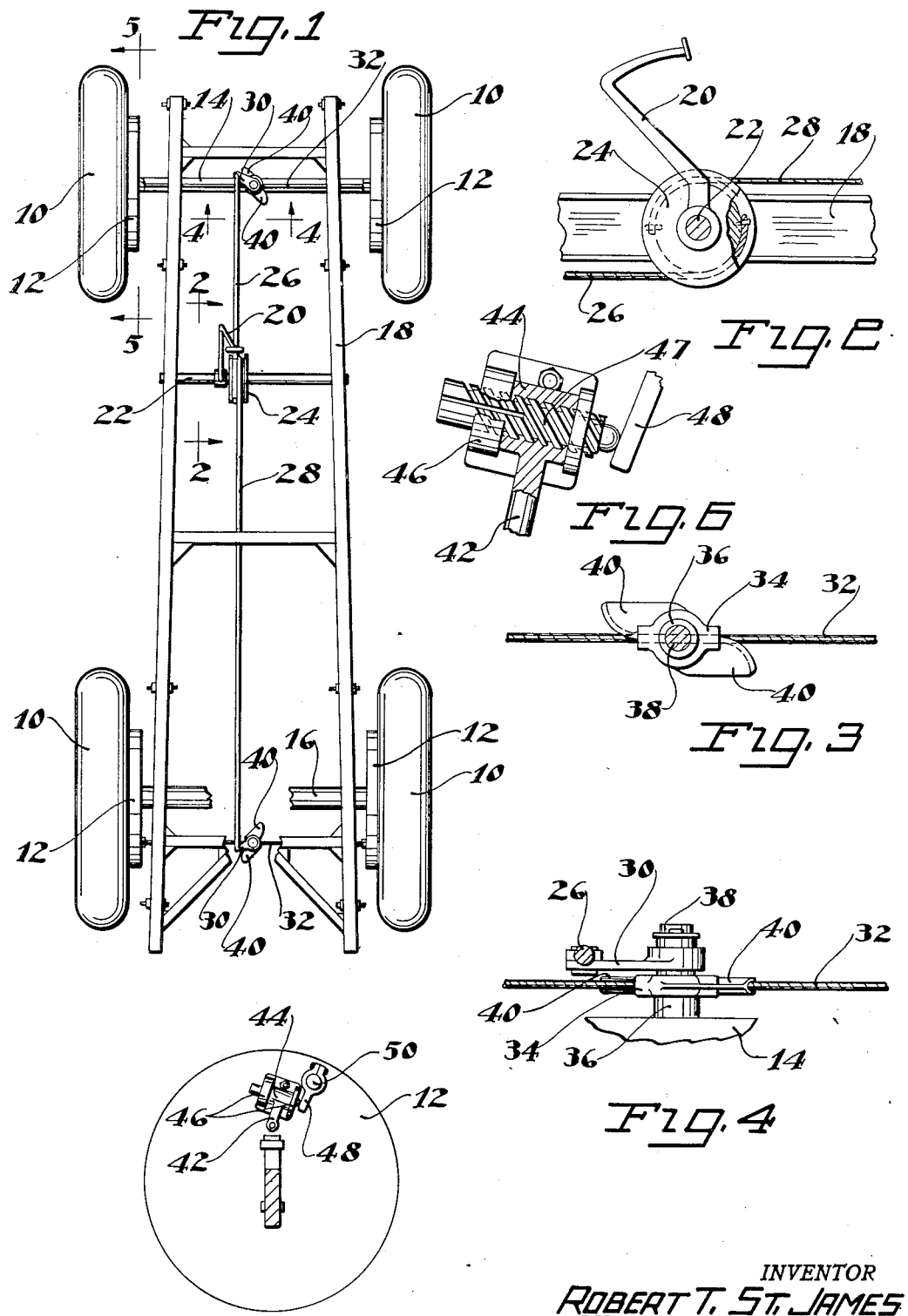
INVENTOR
ROBERT T. ST. JAMES
BY
M. W. McConkey
ATTORNEY Patented June 26, 1934

1,964,185

UNITED STATES PATENT OFFICE 1,964,185

BRAKE-OPERATING MECHANISM

Robert T. St. James, Chicago, Ill., assignor to Bendix Brake Company, South Bend, Ind., a corporation of Illinois.

Application October 30, 1930, Serial No. 492,276

5 Claims. (Cl. 188—10)

This invention relates to brakes and is illustrated as embodied in novel operating mechanism for a system of four-wheel automobile brakes. An object of the invention is to provide a simple system of operating connections, preferably capable of being made up mainly of flexible cables, thereby eliminating the more expensive shafts and the like of the conventional brake hookups.

In the arrangement illustrated, the brake pedal or its equivalent operates a device such as a drum to tension cables extending forwardly and rearwardly and connected to devices adjacent the front and rear axles and which in turn are operable to tension transverse cables which operate the four brakes. Various features of novelty relate to the mounting of the drum and to the arrangement and construction of the devices which tension the transverse cables, and to the device at the brake which is operated by the transverse cable to apply the brake, and to other novel and desirable features of construction and arrangement which will be apparent from the following description of the illustrated embodiment shown in the accompanying drawing, in which:

Figure 1 is a diagrammatic top plan view of an automobile chassis showing one embodiment of the invention;

Figure 2 is a partial section on the line 2—2 of Figure 1 showing the arrangement of the pedal in side elevation;

Figure 3 is an enlarged view in a horizontal plane looking downwardly, showing on an enlarged scale the device for tensioning the transverse cable for the front brakes;

Figure 4 is a partial section on the line 4—4 of Figure 1 showing this device in rear elevation;

Figure 5 is a section on the line 5—5 of Figure 1 looking outwardly at the left front brake; and Figure 6 is a partial section through the brake applying device on a larger scale than Figure 5.

The chassis shown in Figure 1 includes the usual road wheels 10 having brakes 12 and supporting front and rear axles 14 and 16 which in turn support, through the usual springs, a chassis frame 18 of any desired construction. The present invention relates to the mechanism for operating brakes 12.

In the particular embodiment illustrated, a brake pedal 20 or an equivalent operating device, shown fixed on a shaft 22 journaled in the frame 18, is arranged to operate a drum 24 to which are secured the ends of a forwardly extending cable 26 and a rearwardly extending cable 28, the cables being connected to the periphery of the drum 24 so that depression of the pedal 20 serves to tension both of the cables. Each of the cables 26 and 28 is connected to a lever 30 forming part of a novel brake operating device shown in detail in Figures 3 and 4. Each of these brake operating devices is intended to operate a transverse cable 32 connected between the front (or rear) brakes, and to this end each of these devices is formed with a central tubular portion 34 through which the cable passes and with a hub 36 journaled on a fulcrum pin 38 provided with a suitable transverse opening for the cable 32. Each operating device has oppositely extending portions 40 which engage the cable when the device is turned by tension on the cable 26 or 28 and which operate when so turned to tension the cable 32.

The opposite ends of the cables 32 are connected to levers 42 having hubs 44 received between lugs 46 on a bracket mounted on the backing plate and formed internally with worm threads meshing with an external worm thread on a thrust pin 47 engaging the brake cam shaft lever 48 which in turn operates the cam shaft 50 of the brake. It will be seen that tension on the cable 32 moves the lever 42 in a plane at right angles to the plane of movement of the lever 48 and shifts the thrust member 47 in a direction to operate the lever 48 and its shaft 50.

While one illustrative embodiment has been described in detail, it is not my intention to limit the scope of the invention to that particular embodiment or otherwise than by the terms of the appended claims.

I claim:

1. Operating mechanism for a pair of brakes comprising a flexible tension member connected between the brakes, and a pivoted operating member having a straight line tubular portion through which the tension member passes normally aligned with the flexible tension element and having oppositely extending arms engageable with said tension member to tension it when the operating member is turned.

2. A brake operating device comprising a pivoted member having a straight line tubular portion for the passage of a brake cable normally aligned with said brake cable and having oppositely extending arms arranged to engage said cable passing through the tubular portion and tensioning the cable when the operating member is turned.

3. Brake operating mechanism comprising an operating lever, a thrust member engageable with said lever and formed with a worm thread, and an applying lever having a hub formed with a worm thread meshing with the first-mentioned thread and which applying lever is movable in a plane at right angles to the plane of movement of the first lever.

4. A vehicle having a pair of front brakes; a pair of rear brakes; an operating device for each of said brakes, each operating device comprising a lever, a thrust member engageable with said lever and formed with a worm thread, and an applying member having a hub formed with a worm thread meshing with the first mentioned thread, the applying member being movable in a plane substantially at right angles to the plane of movement of the lever; an operating cable connected between the applying members of the front brakes, an operating cable connected between the applying members of the rear brakes, a device for tensioning each of said cables; a cable extending from each of said tensioning devices toward the center of the vehicle; and a driver operated drum to which each of said last mentioned cables is connected.

5. In operating mechanism for a pair of brakes, a lever for actuating each brake, a power multiplying and power direction changing device acting on each lever, a tension member extending substantially at right angles to the plane of movement of the lever and connecting the two said devices, and a pivoted operating member having a tubular portion through which the tension element passes and having oppositely extending arms engageable with said element to tension it when the operating member is turned.

ROBERT T. ST. JAMES.